June 8, 1937.  W. DÄLLENBACH  2,083,317

DEVICE CONTROLLED BY RADIATED ENERGY

Filed Dec. 6, 1934  2 Sheets-Sheet 1

Inventor:
WALTER DÄLLENBACH
By Bailey & Larson
ATTORNEYS

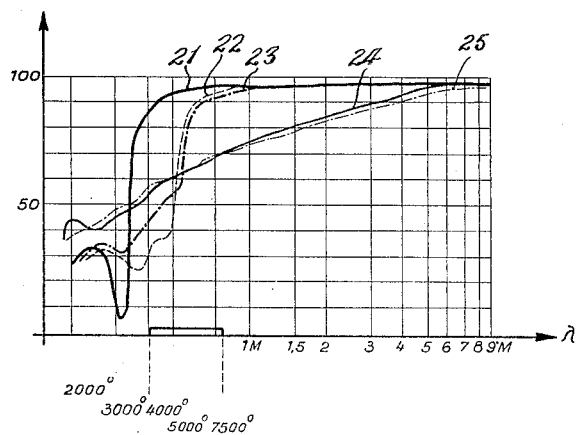

Patented June 8, 1937

2,083,317

UNITED STATES PATENT OFFICE 2,083,317

DEVICE CONTROLLED BY RADIATED ENERGY

Walter Dällenbach, Berlin-Charlottenburg, Germany, assignor to N. V. Machinerieen-en Apparaten Fabrieken "Meaf", Utrecht, Netherlands Application December 6, 1934, Serial No. 756,326
In Germany December 22, 1933

10 Claims. (Cl. 297—11)

The present invention relates to a switching device controlled by radiated energy, in which a part, subjected to radiation and extending in consequence of its being heated, is protected against heat leakage by means of a vacuum vessel. Such a switching device may, for example be employed for the purpose of switching of illuminating devices on and off in dependence upon the brightness.

In accordance with the present invention the radiative sensitive body of extension will be enclosed in a hollow space of a double-walled vessel which has been evacuated between its walls.

A further characteristic feature of the present invention resides in that the body which varies in length under the influence of the heat is not heated directly through the medium of the radiative energy coming from the outside, but indirectly by means of a second body which has been provided on the surface of the inner wall of the vacuum vessel.

A further characteristic feature resides in employing as a radiation-absorbing body not a black body which has so far been looked upon as being the most favourably acting radiation absorber, but a body possessing at the point and in the vicinity of the maximum in the spectral distribution of the reflected energy of the black body a reduced emission power which is as low as possible and with it also an absorption power which is as low as possible. It has been proved that platinum possesses these properties to an unexcelled extent. The advantageous mode of action will be elucidated hereinafter.

A further characteristic feature of the present invention resides in using as a radiated body a body which possesses a photo-electrically effective layer applied to the outer surface of the inner wall of the evacuated double tube. The mode of action of this body will also be explained further on in the present specification.

Other features of the invention will be apparent from the following description of exemplary embodiments thereof, the drawings and the claims.

Figure 4:
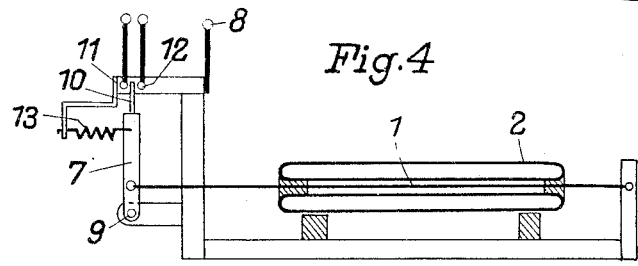
Figure 5:
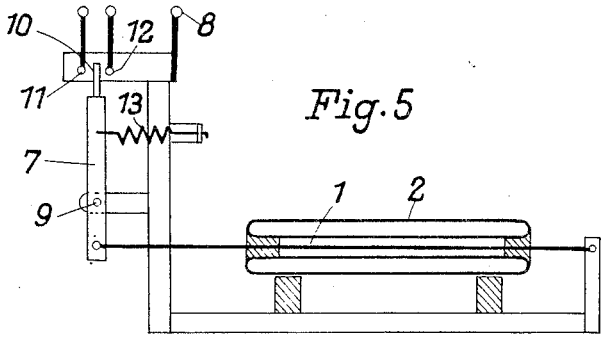

Figs. 4 and 5 diagrammatically show how the invention can be used for producing switching operations.

Fig. 6 is a graph showing curves giving the reflexion possibilities of some metals, dependent on the wave length of the incident radiations.

Figure 1:
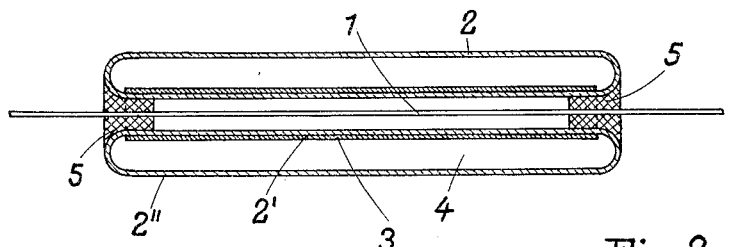
Fig. 1 shows in longitudinal section a radiation switch arrangement in accordance with the invention.

In Fig. 1 the wire 1 is surrounded by a glass vessel 2 consisting of two concentric glass tubes fused together at their ends. The inner tube 2' is suitably blackened on its outer surface, whereas the outer tube 2" is, on the other hand, left perfectly clear and transparent. The space 4 should be evacuated to the highest possible degree so that heat conductivity between 2' and 2", otherwise caused by gas, is rendered impossible. The incident radiation passes through the tube 2" consequently striking the blackened part 3, where it is absorbed. The tube 2' is, for that reason, made to attain a higher temperature than the tube 2" and the wire 1, being located in the interior of 2', is made to attain the temperature of the enveloping tube in view of the fact, that it is enirely enclosed within the blackened tube.

For the purpose of preventing the passage of heat in an outward direction, the ends of the inner tube 2' have been closed up by means of stoppers 5 consisting of a highly insulating material, for example, spun glass or glass wool. It may also prove suitable to discontinue the wire as it leaves the interior space and to connect it to a heat insulating material, or at least, to interrupt the wire, for the purpose of keeping the heat conductivity of the wire itself, which otherwise would be in connection with the exterior at its end, within the lowest possible limits.

The arrangement is very simple and cheap to manufacture. Furthermore, the arrangement is perfectly insensitive to fluctuations of the atmospheric pressure. It is advisable to select the wire 1, which may also have the form of a band, of a small diameter, as far as this is possible with regard to the power to be transmitted. It will further be convenient to keep the tube 2' or, in other words, its dimensions, within the smallest possible limits in order to be able to reduce equally the volume of the surrounding air bolster to be heated.

Figure 3:
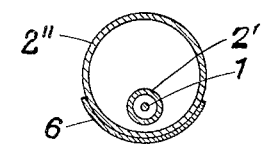
Fig. 3 shows a modified form of the arrangement shown in Fig. 2.
Figure 2:
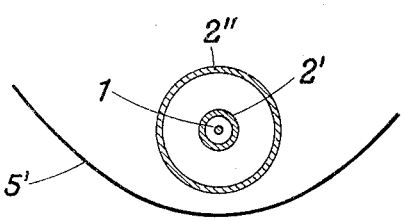
Fig. 2 is a cross section of the same arrangement as shown on Fig. 1, placed in the focal point of a concave mirror for rapid heating.

A rapid heating of the blackened tube 2' will be particularly attained by the fact that, seen in its cross section, it is disposed in the focal line of a parabolic cylindrical mirror, adapted to collect the rays from a large range or zone and to project same on to the tube 2'. In view of the fact that the tube 2', at all events, possesses a certain spacial extension, it will thus be possible to allow the parabolic mirror 5' Fig. 2, a certain deviation from the purely parabolic development, that is, in such a manner, that a focal point is produced, which will correspond to the size of the blackened tube 2'. This will, for instance, be the case, if, instead of a parabola, a reflector which approaches more or less a circular shape is made use of, being, for this reason alone, much more convenient to be produced. The most simple modus operandi is to provide the outer tube 2" on one side with a reflecting coating 6 and to dispose the inner tube in the focal point or caustic line of said mirror. In connection with a circular, outer tube 2" it is known, that the focal point will be situated half the radius from the center of the circle or from the vertex of the mirror. (Fig. 3).

Figs. 4 and 5 represent a few examples of how the invention can be utilized to effect switching operations. In Fig. 4, 1 is again the wire the length of which is adapted to vary, and 2 the evacuated glass vessel enclosing said wire. A contact lever 7 is connected with a terminal 8 and supported by an edge 9. The contact 10 of the lever 7 is associated either with the contact 11 or 12, according to the length of the radiated wire 1, and it will be possible, by means of these contacts, to bring about various effects, for example, the switching in and the switching out of illuminating devices in dependence upon the brightness of daylight. The reference numeral 13 represents a spring which balances the tension of the wire 1.

An identical arrangement has been represented in Fig. 5. The difference between that and the arrangement shown in Fig. 4 consists in that the wire is made to engage another point of the contact lever 7. In this case, for instance, the edge 9 is located outside the two points of application of the wire 1 and the counter-spring 13.

As already observed, the most favorable effect will not be attained, for instance, by applying a black body as a radiation receiver, that is, as a coating upon the surface of the inner wall of the evacuated double tube. Experiments and careful deliberations, rather, have shown, that this view is incorrect. A body will, rather, then be heated to the greatest possible extent, if within the spectral range of the visible light or the radiation to be received, the highest possible degree of absorption is present and if without the visible light or the radiation to be received, for example, within the region of the infra-red emission, particularly in the vicinity of the maximum emission of black bodies, the absorption, and with it also the emission, moves within the smallest possible limits.

An object of the present invention is, therefore, an arrangement embodying the abovementioned points and the essential characteristic features of which consist that at the point and in the vicinity of the maximum of the spectral distribution of the reflected energy of a black body, the radiation absorbing surface possesses a reduced, or as low as possible an emissive power and with it also an equally low absorbing power.

If the body, enclosed within the vacuum and insulated relatively to its surrounding parts, has a temperature which is a few degrees higher than that of said surrounding parts, the temperature radiation emitted by the body, will exceed the temperature radiation absorbed by the surrounding parts. With a black body, the differential radiation, that is, the excess of the radiation over the absorption also in the infrared region, will have a maximum in the neighbourhood of $8\mu$ which embodies a comparatively strong drop towards the longer, as well as towards the shorter waves. It will now be a great advantage, if a body, located in the vacuum, which is to assume a higher temperature under the influence of the absorption of visible light, reflects just at this point of the maximum to the strongest possible extent and, in accordance with the acceptation of Kirchhoff's law of radiation, therefore, emits to the least possible extent.

There are a large number of chemical compounds and also of elements, which will answer these requirements. For instance, the $SiO_2$ group shows in all combinations a comparatively high power of reflection in the neighbourhood of the abovementioned maximum of $\lambda = 8\mu$. Certain metals show even more favorable results, and among these, for example, tungsten, copper and gold show the most favorable results. These metals are excellent conductors and possess, for that reason, in the long-wave range (infra-red), a power of reflection which is very near 1. This power of reflection declines in the visible region, which can be appreciated without any difficulty when considering the color of copper and gold. Not only the yellow color of the gold, but also the reddish color of the copper, proves, that the wave lengths towards the blue and the violet are no longer reflected, but absorbed.

In Fig. 6 a few curves have been plotted indicating the power of reflection of different metals at indoor temperature, in dependence upon the wave length of the incident radiation. Curve 21 shows the reflection power for silver, curve 22 for gold, curve 23 for copper, curve 24 for nickel, and curve 25 for platinum. It is recognized, for instance, that such metals as silver, gold and copper possess in the long-wave region a power of reflection approaching 100%, thereby favorably distinguishing themselves from a black body with regard to secondary emission. It has also been proved that the power of reflection of silver is not perceptibly decreased except beyond the visible spectrum, so that this material is not suited nearly so well for measuring solar radiation as gold and copper. Gold and copper exhibit even within the visible spectrum an extraordinarily strong decrease of the reflection and in connection therewith a considerable increase in absorption.

Experiments have proved that platinum shows an even more favorable result than copper, gold or tungsten. The radiative-sensitive bodies possessing the properties mentioned, may be disposed either on the surface of the inner wall of the double-walled tube or immediately on the surface of the body the length of which is adapted to vary. Finally, the last mentioned body may be made to consist wholly of the favorably acting materials.

Furthermore, most excellent results are obtainable by employing photo-electrically effective layers. Such a layer, which must adjoin a high vacuum, is exposed to radiation. Suitably, the layer is applied to the outer surface of the inner wall of the evacuated double tube. The mode of action of the photo-electrically effective layer may be explained in the following manner:

By means of the light, electrons are released in the photo-electrically effective layer in a photo-electrical manner. The electrons leave the surface so that the latter is positively charged.

The electrons afterwards dropping back upon the coating, produce heat when hitting said coating.

In accordance with the invention, the layer may consist of photo-electrically effective metals, particularly of alkali metals or of compounds thereof. An especially favorable effect will be attained with the aid of caesium. An example of a coating or layer, consisting of a metallic compound, is represented by the hydrogenized potash cell. The metals or their compounds are suitably applied to an oxidized coating or layer of silver.

A further example of the present invention consists in utilizing semi-conductors applied to metal as a photo-electrically effective layer or coating. For these purposes particularly oxides and sulphides will have to be considered. The incident light upon the sensitive layer or coating most probably causes the so-called rejective-layer photo-electric effect, to which must be attributed the favorable effect attained thereby. Through the medium of the light, electrons are released on the border between the semi-conductor and the metal, so that the electrons emanate from the semi-conductor. The layer or coating of the surface charges itself positively. The electrons, dropping back upon the coating or layer, are instrumental in producing the heating effect as in the first example of the invention described above.

It has been proved with the aid of experiments that a film of copper oxide applied to a layer or coating of copper, exercises a very much more intensive effect than the pure copper coating. The copper oxide possesses, however, the tendency to reduce itself to copper in the course of time owing to its being heated in the high vacuum. An unlimited life is attained by the employment of nickel provided with a film of nickel oxide. Also iron, covered with a film of iron oxide has, as proved by experiments, shown gratifying results. The two last mentioned oxides possess, as a matter of fact, such low oxygen pressures, that even in the highest vacuum, a reduction of the oxides does not take place. It is, for this reason, a further characteristic feature of the present invention, to apply to the metal coating a semi-conducting film or layer which, in relation to moderate increases in temperature (200–300°) is stable in the high vacuum.

For the purpose of attaining as great an effect as possible a photo-electrically effective substance should be employed which possesses the highest possible sensitivity in the spectral region of the visible light. Of the metals referred to, caesium, for example, is such a substance.

The photo-electrically effective coating or layer may be immediately applied to the part adapted to extend owing to its being heated. In this case, the extending body has to transmit its extension in length through the medium of the wall of the vacuum vessel, being so designed as to be of a yielding character, to the parts arranged outside of the vacuum vessel and to be controlled by radiation. The transmission may be effected, for example, with the aid of a gas valve.

A more simple construction can, as already mentioned, be obtained by causing the part, the longitudinal change of which effects the control, to be enclosed in a double-walled jacket evacuated between the walls. The photo-electrically effective layer or film may, if employing such a double-walled jacket, be applied to the surface of the inner tube of the double-walled jacket. Both walls of the double jacket may be made to consist of glass. On the other hand, however, the inner tube may be made immediately from the photo-electrically effective metal.

Finally, when making use of the suppressing film photo-electric effect, the inner tube may be made to consist of metal, the surface of which has been oxidized or coated by means of the sulphide of the metal.

What I claim is:

1. A device for operating switches and the like, comprising, a member adapted to expand or contract under the influence of incident radiative energy, a double walled receptacle encompassing said member, the space between the walls of said receptacle being evacuated, the outer wall of said double walled receptacle being radiation permeable.

2. A device for operating switches and the like, comprising, a member adapted to expand or contract under the influence of incident radiative energy, a double walled glass receptacle encompassing said member, the space between the walls of said receptacle being evacuated, the vacuum side surface of the inner wall of said receptacle having a layer of material thereon possessing high radiation-absorbing properties.

3. A device for operating switches and the like comprising, a member adapted to expand or contract under the influence of incident radiative energy, a receptacle consisting of two glass cylinders one disposed within the other, the space between the cylinders being evacuated, one of the surfaces of said inner cylinder being of platinum whereby capacity to absorb the ultra-red spectral range is reduced, said member being disposed in the space surrounded by the inner cylinder.

4. A device for operating switches and the like comprising, a member adapted to expand or contract under the influence of incident radiative energy, a receptacle consisting of two glass cylinders one disposed within the other, the space between the cylinders being evacuated, one of the surfaces of said inner cylinder being covered with a radiation absorbent substance, said member being disposed in the space surrounded by the inner cylinder, and heat insulating material closing off the openings of said inner cylinder.

5. A device for operating switches and the like comprising, a member adapted to expand or contract under the influence of incident radiative energy, a receptacle consisting of two glass cylinders one disposed within the other, the space between the cylinders being evacuated, one of the surfaces of said inner cylinder being covered with a radiation absorbent substance, said member being disposed in the space surrounded by the inner cylinder, heat insulating material closing off the openings of said inner cylinder, and a cylindrical mirror having a parabolic cross section, said inner cylinder being disposed in the focal line of said mirror.

6. A device for operating switches and the like, comprising, a member adapted to expand or contract under the influence of incident radiative energy, a double walled receptacle encompassing said member, the space between the walls of said member being evacuated, and a photo-electrically active alkali metal layer on the vacuum side surface of the inner wall of said receptacle.

7. A device for operating switches and the like, comprising, a member adapted to expand or contract under the influence of incident radiative energy, a double walled receptacle encompassing said member, the space between the walls of said receptacle being evacuated, and a coating of a semi-conductive material on the vacuum surface of the inner wall of said receptacle, said coating being a metal oxide.

8. A device for actuating switches and the like comprising, a member expanding through heating dependent upon an incident radiation, a double wall vessel encompassing said member and enclosing a vacuum between the outer radiation-permeable wall and the inner radiation-absorbent wall.

9. A device for operating switches and the like comprising, a member adapted to expand or contract under the influence of incident radiation, a receptacle consisting of two glass cylinders one disposed within the other and being fused together at the ends, the space between the cylinders being evacuated, a coating of radiation absorbent material on the vacuum side of the inner cylinder, said radiation absorbent coating possessing a high absorbent power at the point and in the vicinity of the maximum of the spectral energy distributing curve of incident radiation and a low emission and absorbent power at the point and in the vicinity of the maximum reflecting energy of a black body at substantially the same temperature as said coating.

10. A device for operating switches and the like comprising, a member adapted to expand or contract under the influence of incident radiative energy, a receptacle consisting of two glass cylinders one disposed within the other, the space between the cylinders being evacuated, one of the surfaces of said inner cylinder being covered with a substance having a high absorbent capacity with respect to visible light and a low absorbent capacity for rays in the infra-red spectral range.

WALTER DÄLLENBACH.